United States Patent
Lunsford et al.

(10) Patent No.: US 6,359,076 B1
(45) Date of Patent: *Mar. 19, 2002

(54) CROSSLINKABLE CARPET-BACK COATING WITH HYDROXY-FUNCTIONALIZED VINYL ACETATE EMULSION POLYMERS

(75) Inventors: David J. Lunsford, Simpsonville, SC (US); John C. Leighton, Flanders, NJ (US)

(73) Assignee: National Starch and Chemical Investment Holding Corporation, New Castle, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/208,555

(22) Filed: Dec. 9, 1998

(51) Int. Cl.$^7$ .................... C09D 131/04; C09D 133/14; C09J 131/04; D06N 7/00
(52) U.S. Cl. .................... 525/330.3; 524/401; 524/451; 525/330.5
(58) Field of Search .................... 524/401, 451; 525/330.5, 330.3

(56) References Cited

U.S. PATENT DOCUMENTS

| 3,458,485 A | 7/1969 | Craig ........................ 260/79.5 |
| 4,529,767 A * | 7/1985 | Bashleben et al. .......... 524/323 |
| 4,696,951 A | 9/1987 | Lunsford et al. ............. 521/65 |
| 4,840,991 A * | 6/1989 | Sekmakas .................... 524/812 |
| 4,963,422 A | 10/1990 | Katz et al. .................... 428/90 |
| 5,026,765 A | 6/1991 | Katz et al. .................... 524/561 |
| 5,401,553 A | 3/1995 | Miwa et al. ................... 428/94 |
| 5,849,389 A * | 12/1998 | Lunsford ...................... 428/95 |

FOREIGN PATENT DOCUMENTS

| JP | 56-140152 | 11/1981 | ............ D04H/1/58 |
| JP | 56140152 | * 11/1981 | ............ D04H/1/58 |
| JP | 58141251 | * 8/1983 | ............ C09D/3/81 |

OTHER PUBLICATIONS

Translation of Saito et al. (JP 58 141251), 8/83.*

* cited by examiner

Primary Examiner—David W. Wu
Assistant Examiner—Kelechi Egwim
(74) Attorney, Agent, or Firm—Thomas F. Roland, Esq.

(57) ABSTRACT

A carpet back coating composition which is an aqueous emulsion polymerization product of ethylene, vinyl acetate, and a ethylenically unsaturated hydroxy-functional monomer to form an emulsion copolymer which is combined with a crosslinking agent selected from the group consisting of multifunctional aziridine, multifunctional isocyanate, and multifunctional epoxide. Carpets prepared with the carpet back coating compositions exhibit improved wet strength. The improvement in wet strength is achieved by means of crosslinking reactions which do not generate volatile organic compounds as by-products.

7 Claims, No Drawings

CROSSLINKABLE CARPET-BACK COATING WITH HYDROXY-FUNCTIONALIZED VINYL ACETATE EMULSION POLYMERS

FIELD OF THE INVENTION

This invention relates to a carpet back coating composition which is an aqueous emulsion polymerization product of ethylene, vinyl acetate, and a ethylenically unsaturated hydroxy-functional monomer to form an emulsion copolymer which is combined with a crosslinking agent selected from the group consisting of multifunctional aziridine, multifunctional isocyanate, and multifunctional epoxide. Carpets prepared with the carpet back coating compositions exhibit improved wet strength. The improvement in wet strength is achieved by means of crosslinking reactions which do not generate volatile organic compounds as by-products.

BACKGROUND OF THE INVENTION

An important characteristic of carpet, especially carpet tiles, is the wet strength. Currently, carpets may be routinely exposed to water from steam cleaning processes. In such situations wet strength of the carpet is important since inadequate wet strength can cause fraying of the carpet edges, and shrinking or curling of carpet tiles. Such surface changes in carpet are undesirable and can result in personal injuries.

Carpets generally comprise a tufting substrate with yarn tufts in the form of cut or uncut loops extending upwardly from the tufting substrate to form a pile surface. In the case of tufted carpets, the yarn is inserted into the tufting substrate by tufting needles and a pre-coat or binder is applied thereto. In the case of non-tufted or bonded pile carpets, the fibers are embedded and held in place by the binder composition.

With both types of carpets, the carpet also usually includes a secondary backing bonded to the primary backing. The secondary backing provides extra padding to the carpet, absorbs noise, adds dimensional stability, and functions as a heat insulator. The secondary backings commonly used are fabrics, PVC plastisol, polyurethane, foam sheet such as PVC or urethane, and bitumen.

The physical properties of a carpet pre-coat or carpet binder, hereinafter referred to as a "carpet back coating", are important. Such properties include the following: (1) it must be capable of being applied to a carpet and dried using conventional processes and equipment; (2) it must provide excellent adhesion to the pile fibers to secure them firmly to the backing both in the tufted and non-tufted constructions; (3) it must have low smoke density values and high flame retardant properties; and (4) it must maintain sufficient softness and flexibility, even with a high filler loading or at low temperature, to enable the carpet, if prepared in continuous form, to be easily rolled and unrolled during installation and, in the case of carpet tiles that the tile have sufficient rigidity so as to be easily set in place.

Typical carpet tile backings have either been prepared from an all polyvinyl chloride (PVC) plastisol matrix or a combination of ethylene-vinyl acetate precoat with a PVC plastisol secondary coating. While PVC plastisols exhibit good water resistance, the disadvantage with PVC plastisol is a high degree of smoke generation which can present a serious safety issue. Carpet prepared with an ethylene-vinyl acetate precoat with a PVC secondary backing exhibits low smoke density values and high flame retardant properties, but tends to have lower wet strength than all PVC plastisol-based carpets as evidenced by low wet tuft bind values.

Japan Patent No. 56-140152 describes a fiber bonding agent which is composed of (A) an aqueous dispersion of a copolymer composed of 0.1–3.0 parts by weight ethylenically unsaturated monocarboxylic acids or ethylenically unsaturated polyhydric carboxylic acids per 100 parts by weight ethylene vinyl acetate copolymer, and (B) an aqueous dispersion of a compound containing two or more multifunctional aziridine groups. However, the disadvantage of the compositions described in Japan Patent No. 56-140152 is poor compound stability due to the presence of the carboxyl groups on the copolymer.

U.S. Pat. No. 3,458,485 describes a resin solution prepared from styrene, vinylidene or vinyl chloride, and 13 to 45 weight percent of hydroxyethyl acrylate, based on the weight of the copolymer, which is combined with 6 to 20 weight percent, based on the weight of the copolymer, of a crosslinking agent to form a thermosettable resin mixture. However, the disadvantage of the resin solution described in U.S. Pat. No. 3,458,485 is the amount of hydroxyethyl acrylate and crosslinking agent which render the resins prohibitively expensive for use as carpet coatings.

SUMMARY OF THE INVENTION

Accordingly, it is an object of the present invention to provide a crosslinkable carpet back coating composition which is applied to a carpet and dried/cured without emitting volatile organic compounds (VOC's) as a by-product of the crosslinking reaction.

It is another object of the invention to provide a carpet back coating which has low smoke density values and high flame retardant properties.

It is also an object of the invention to provide carpet with improved wet strength resisting the tendency of edge fraying and shrinking/curling when exposed to moisture or water.

It is a further object of the invention to provide a carpet back coating which maintains sufficient softness and flexibility, even with a high filler loading and at a low temperature, to enable the carpet, if prepared in continuous form, to be easily rolled and unrolled during installation and, in the case of carpet tiles that the tile have sufficient rigidity so as to be easily set in place.

With regard to the foregoing and other objects, the present invention provides a crosslinkable carpet back coating composition comprising:

(i) an aqueous emulsion polymerization product of
  (a) from about 4 to about 25 weight percent of ethylene;
  (b) from about 67 to about 95 weight percent of vinyl acetate; and
  (c) from about 0.1 to about 8 weight percent of at least one ethylenically unsaturated hydroxy functional monomer, wherein the weight percents of monomers used to prepare the copolymer are based on the weight of (a)+(b)+(c); and
(ii) from about 0.5 to about 9 weight percent, based on the weight of the copolymer, of a crosslinking agent selected from the group consisting of multifunctional aziridine, multifunctional isocyanate, and multifunctional epoxide, wherein the crosslinking reaction does not generate volatile organic compounds as by-products. Preferably the ethylenically unsaturated hydroxy-functional monomer has the formula

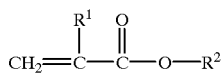

wherein $R^1$ is hydrogen or methyl and $R^2$ is a hydroxy alkyl group having from 2 to 6 carbon atoms.

According to another aspect the invention provides a method for treating carpet to improve the wet strength of the carpet, said method comprising:

(I) applying a carpet back coating composition to carpet or tufts of yarn, said carpet back coating composition comprising:
  (i) an aqueous emulsion polymerization product of
    (a) from about 4 to about 25 weight percent of ethylene;
    (b) from about 67 to about 95 weight percent of vinyl acetate; and
    (c) from about 0.1 to about 8 weight percent of a ethylenically unsaturated hydroxy-functional monomer, wherein the weight percents of monomers used to prepare the copolymer are based on the weight of (a)+(b)+(c); and
  ii) from about 0.5 to about 9 weight percent, based on the weight of the copolymer, of a crosslinking agent selected from the group consisting of multifunctional aziridine, multifunctional isocyanate, and multifunctional epoxide to form a crosslinkable carpet back coating composition; and (II) drying the crosslinkable carpet back coating composition at a temperature sufficient to react the aziridine, isocyanate, or epoxide functional groups on the crosslinking agent with the hydroxy functional groups on the copolymer, wherein the crosslinking reaction does not generate volatile organic compounds as by-products.

The carpet back coatings of the present invention display significant improvements in wet strength as compared to commercially available carpet back coatings. Additionally, carpets prepared with the carpet back coatings of the invention may exhibit improved resistance to edge fray and/or shrink and curl when exposed to moisture or water. Moreover, the carpet back coating compositions of the invention require only a minimal amount of crosslinking multifunctional aziridine or multifunctional isocyanate crosslinking agent in order to achieve significant increases in wet strength as evidenced by higher wet tuft bind values.

DESCRIPTION OF THE INVENTION

The invention provides an improved carpet back coating composition. The composition is applicable to all carpets including tufted, woven, nonwoven, needlepunched, knitted and hooked carpets. Carpets prepared using the carpet back coating composition of this invention exhibit improved wet strength as evidenced by higher wet tuft bind values as compared to prior art coating compositions.

The carpet back coating composition is an aqueous emulsion polymerization product of ethylene, vinyl acetate, and a ethylenically unsaturated hydroxy-functional monomer to form an emulsion copolymer which is combined with a crosslinking agent selected from the group consisting of multifunctional aziridine, multifunctional isocyanate, and multifunctional epoxide. No volatile organic compounds are generated during crosslinking of the aziridine, isocyanate, or epoxide functional groups on the crosslinking agent with the hydroxy functional groups on the copolymer. The carpet back coating composition is prepared as an emulsion copolymer. As used herein, "emulsion" means a dispersion of particulate matter in an aqueous phase which contains an emulsifier or surfactant suitable for preparing the emulsion.

The amount of ethylene monomer used to prepare the emulsion copolymer is from about 4 to about 25 weight percent, preferably from about 10 to about 20 weight percent, based on the total weight of monomers used to prepare the copolymer. The amount of vinyl acetate used to prepare the emulsion copolymer is from about 67 to about 95 weight percent, preferably from about 75 to about 90 weight percent, based on the total weight of monomers used to prepare the copolymer.

The ethylenically unsaturated hydroxy-functional monomer has the formula:

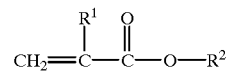

In the above formula for the hydroxy functional monomer, $R^1$ is hydrogen or methyl and $R^2$ is a hydroxy alkyl group having from 2 to 6 carbon atoms. Examples of hydroxy functional monomers are hydroxyethyl acrylate, hydroxybutyl acrylate, and hydroxypropyl acrylate. Combinations of hydroxy functional monomers can also be used. The amount of ethylenically unsaturated hydroxy-functional monomer used to prepare the emulsion copolymer is from about 0.1 to about 8 weight percent, preferably from about 1 to about 5 weight percent, based on the total weight of monomers used to prepare the copolymer.

The emulsion copolymer is prepared using conventional procedures which are known in the art, using either batch process, continuous monomer addition or incremental monomer addition. The emulsion copolymer is generally prepared with an emulsifier and/or a protective colloid which are known in the art.

Suitable emulsifiers include anionic, cationic, nonionic or mixtures thereof. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable nonionic emulsifiers are the addition products of 5 to 50 moles of ethylene oxide adducted to straight-chain and branch-chain alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof.

Suitable protective colloids include polyvinyl alcohols, ionically modified starches, water-soluble starches, starch ethers, polyacrylic acid, carboxymethyl cellulose, natural gums, gelatin, synthetic polymers, and water-soluble cellulose ethers such as hydroxyethyl cellulose.

Essentially any type of free radical generator can be used to initiate the free radical emulsion polymerization. For example, free radical generating chemical compounds, ultraviolet light or radiation can be used. The choice of free radical generating chemical compound depends on the desired polymerization rate and final polymer properties. Some representative examples of free radical initiators which are commonly used include the various persulfates, percarbonates, perborates, peroxides, organic reducing agents such as ascorbic acid, and combinations thereof.

The free radical emulsion polymerization will typically be conducted at a temperature which is within the range of about 30° C. to about 100° C. It is generally preferred for the polymerization to be carried out at a temperature which is with the range of 50° C. to about 90° C.

The emulsion polymerization is carried out at a pH of from about 2 to about 7, preferably at a pH of from about 3 to about 5. In order to maintain the pH range, it may be useful to work in the presence of customary buffer systems, for example, in the presence of alkali metal carbonates, alkali metal acetates, and alkali metal phosphates. Polymerization regulators, like mercaptans, aldehydes, chloroform, methylene chloride and trichloroethylene, can also be added. Other ingredients known in the art to be useful for various purposes in emulsion polymerization, such as acids, salts, chain transfer agents, and chelating agents, can be employed.

Although the solids content and viscosity of the emulsion can vary typical total solids content which is defined as the nonvolatile components of the emulsion is in the range of from about 20 to about 80 weight percent, preferably 50 to 75 weight percent, based on the total weight of the emulsion.

The emulsion copolymer is combined with a crosslinking agent selected from the group consisting of multifunctional aziridine, multifunctional isocyanate, and multifunctional epoxide, to form the carpet back coating composition. In the carpet back coating of the invention, the multifunctional aziridine, isocyanate, or epoxide groups on the crosslinking agent react with the hydroxy groups on the copolymer. The crosslinking reaction of the invention does not generate volatile organic compounds as a by-product of the crosslinking reaction. The crosslinking occurs during film formation and bonding. The amount of crosslinking agent formulated with the emulsion copolymer is from about 0.5 to about 9 weight percent, preferably from about 1.5 to about 7 weight percent, based on the weight of the copolymer.

The carpet back coating compositions may further contain, in addition to the above ingredients, at least one additive. Suitable additives are, for example, fillers, dispersants, flame retardants, antimicrobials, foaming agents, thickeners, and colorants. Such additional ingredients and their amounts are known in the art, therefore only fillers, catalysts and acids will be referred to in more detail. Suitable fillers are, for example, calcium carbonate, aluminum hydroxide, clay or talc.

The carpet back coating compositions may optionally include one or more catalysts or acids to speed up the reaction between the crosslinking agent and hydroxy groups on the copolymer. However, the reaction between the crosslinking agent and hydroxy groups on the copolymer does not require a catalyst or acid. The present inventors have determined that a pH of less than 7 is preferred for the crosslinking reaction to take place, therefore a small amount of acid or acid catalyst may be added to the combination of the emulsion and crosslinking agent to decrease the pH if necessary.

The carpet back coating composition is dried/cured on carpet or tufts of yarn at a temperature sufficient to react the crosslinking agent and hydroxy groups on the copolymer. The treated carpet or tufts of yarn are dried/cured at the normal temperatures provided by either a drying unit used in a carpet manufacturing process such as a steam heated drying cylinder or an oven. Drying temperatures generally range from about 90° C. to about 200° C. Such temperatures permit water to be removed and induce crosslinking of the crosslinking agent and hydroxy groups on the copolymer.

The residence time of the carpet coated with the compositions of the invention in the dryer unit or oven ranges from about 30 second to about 15 minutes, depending on the temperature. The actual residence time for a particular sample of carpet depends on the temperature, type of yarn, percent solids of the carpet coating compound, the materials used to prepare the carpet, and the construction of the carpet. Preferably, the time and temperature required to cure the crosslinking agent with the hydroxy groups on the copolymer ranges from about 60 seconds to about 200 seconds at a temperature ranging from about 80° C. to about 220° C., preferably from about 100° C. to about 180° C. After the carpet with the carpet back coating composition applied thereto is dried/cured, subsequent coatings or additives may be applied to the carpet.

Generally, the amount of carpet back coating composition on the carpet is from about 10 to about 50 ounces per square yard, preferably from about 25 to about 35 ounces per square yard. In the case of carpet tiles, the amount of carpet back coating composition on the carpet tile is preferably from about 20 to about 35 ounces per square yard.

The carpet back coatings of the present invention display significant improvements in wet strength as compared to commercially available carpet back coatings, and resist the tendency to edge fray and/or shrink and curl when exposed to moisture or water. Moreover, the carpet back coating compositions of the invention require only a minimal amount of multifunctional aziridine or multifunctional isocyanate crosslinking agent in order to achieve significant increases in wet strength as evidenced by higher wet tuft bind values.

The following nonlimiting examples illustrate further aspects of the invention.

EXAMPLE 1

Preparation of Aqueous Emulsion Copolymer

Three aqueous emulsion copolymers were prepared according to Table I. Emulsion Copolymer No.3 was Dur-O-Set E-190HS which is available from National Starch and Chemical Company.

TABLE I

| Emulsion Copolymer | Ingredients | Stabilizer |
| --- | --- | --- |
| 1 | EVA/3.0 pts HEA | PVOH/nonionic |
| 2 | EVA/3.0 pts HEA | HEC/nonionic |
| 3 | EVA | PVOH/nonionic |

EXAMPLE 2

Preparation of Carpet Back Coating Composition

The aqueous emulsion copolymers prepared in Example 1 were incorporated into Formulation I to form a carpet back coating composition.

| Formulation | Parts by Weight |
| --- | --- |
| Emulsion Copolymer at 60% Solids | 400 |
| Water | 25 |
| $CaCO_3$ Filler | 506 |
| Other | 21.2 |
| Crosslinker | 4–16 |

Other = flame retardent, antimicrobial, etc.

The carpet back coating compositions were determined to have a percent solids of 80% and a Brookfield Viscosity of 3,500 to 8,000 cps at 20 rpm using spindle #3.

EXAMPLE 3
Preparation of Carpet Back Coating Composition

The aqueous emulsion copolymers prepared in Example 1 were incorporated into Formulation II to form a carpet back coating composition.

| Formulation II | Parts by Weight |
|---|---|
| Emulsion Copolymer at 60% Solids | 400 |
| Dispersant (polyacrylate) | 2 |
| $CaCO_3$ Filler | 464 |
| Starch | 15 |
| Thickener | 0–3 |
| Crosslinker | 4–16 |

The carpet back coating compositions were determined to have a percent solids of 81% and a Brookfield Viscosity of 8,000 to 12,000 cps at 20 rpm using spindle #3.

EXAMPLE 4
Samples of Carpet Coated With a Carpet Back Coating Composition The following carpet samples were used to evaluate the carpet back coating compositions prepared in Examples 2 and 3.

| Carpet Styles | Wt (uncoated) | Description |
|---|---|---|
| Carpet Style A | 26–28 oz/yd$^2$ | Nylon Yarns<br>Polyester Tufting Substrate<br>Step Stitch Pattern |
| Carpet Style B | 26–28 oz/yd$^2$ | Nylon Yarns<br>Polypropylene Tufting Substrate<br>Straight Stitch Pattern |

The carpet back coating compositions prepared in Examples 2 and 3 were scrape coated on Carpet Styles A and B using either a foamed or unfoamed compound to achieve proper add-on. The coatings were dried for 8 minutes at 130° C. Coating weights of 25–50 oz/yd$^2$ were achieved. The carpet was then backcoated with polyvinyl chloride plastisol compound (75 mil coating) and cured for 7 minutes at 149° C. The test results are summarized in Table II.

The test results in Table II clearly show that carpets treated with the carpet back coating compositions according to the invention which contained copolymer of ethylene, vinyl acetate, and an ethylenically unsaturated hydroxy-functional comonomer formulated with a multifunctional aziridine or isocyanate crosslinking agent, display significantly improved wet strength. The wet strength improvements are demonstrated by the high wet tuft bind values, as compared to commercially available carpet back coatings or carpet back coatings outside the scope of the invention.

Carpet Samples No. 1, 6, and 8, for example, which were treated with a carpet back coating composition prepared from an ethylene-vinyl acetate copolymer, but no crosslinking agent, exhibited poor wet tuft bind values, and thus, displayed poor wet strength.

While the invention has been described with particular reference to certain embodiments thereof, it will be understood that changes and modifications may be made by those of ordinary skill in the art within the scope and spirit of the following claims.

What is claimed is:

1. A crosslinkable carpet back coating composition comprising:
   a) copolymer, consisting of an aqueous emulsion polymerization product of:
      (a) from about 4 to about 25 weight percent of ethylene;
      (b) from about 67 to about 95 weight percent of vinyl acetate; and
      (c) from about 0.1 to about 8 weight percent of at least one ethylenically unsaturated hydroxy-functional monomer,
      wherein the weight percents of monomers used to prepare the copolymer are based on the weight of (a)+(b)+(c); and
   b) from about 0.5 to about 9 weight percent, based on the weight of the copolymer, of a crosslinking agent selected from the group consisting of multifunctional aziridine, multifunctional isocyanate, and multifunctional epoxide, wherein the crosslinking reaction does not generate volatile organic compounds as by-products.

2. A crosslinkable carpet back coating composition comprising:
   a) copolymer, consisting of an aqueous emulsion polymerization product of:

TABLE II

| Carpet Sample | Emulsion Polymer | Formulation | Style | Crosslinker Type/Amount | Tuft Dry | Binds Wet | % Wet/Dry |
|---|---|---|---|---|---|---|---|
| 1 | 1 control | 1 | A | None | 14.7 | 8.8 | 60% |
| 2 | 1 | 1 | A | Az#2/1.7% | 12.4 | 12.0 | 97% |
| 3 | 1 | 1 | A | Az#2/3.3% | 19.6 | 18.7 | 95% |
| 4 | 1 | 1 | A | Az#2/5.0% | 14.4 | 16.4 | 114% |
| 5 | 1 | 1 | A | Az#2/6.7% | 22.9 | 11.9 | 52% |
| 6 | 3 control | 1 | A | None | 17.7 | 9.8 | 55% |
| 7 | 3 | 1 | A | Az#1/3.3% | 16.6 | 8.5 | 51% |
| 8 | 2 control | 2 | B | None | 17.2 | 6.3 | 37% |
| 9 | 2 | 2 | B | Az#2/1.7% | 20.8 | 10.9 | 52% |
| 10 | 2 | 2 | B | Az#2/5.0% | 22.4 | 13.7 | 61% |
| 11 | 1 | 1 | A | Iso#1/5.0% | 13.4 | 10.0 | 75% |
| 12 | 1 | 1 | A | Iso#1/6.7% | 13.2 | 11.8 | 89% |
| 13 | 1 | 1 | A | Iso#2/5.0% | 17.2 | 12.2 | 71% |
| 14 | 1 | 1 | A | Iso#3/5.0% | 16.6 | 13.2 | 80% |

Az#1 is a multifunctional aziridine (PFAZ-322) available from Sybron Chemicals Inc.
Az#2 is a multifunctional aziridine (XAMA-7) available from EIT Inc.
Iso#1 is a diisocyanate (RUBINATE 9259) available from ICI Chemical Company.
Iso#2 is a diisocyanate (RUBINATE 9472) available from ICI Chemical Company.
Iso#3 is a diisocyanate (RUBINATE 9473) available from ICI Chemical Company.

(a) from about 10 to about 20 weight percent of ethylene;
(b) from about 75 to about 90 weight percent of vinyl acetate; and
(c) from about 1 to about 5 weight percent of a ethylenically unsaturated hydroxy-functional monomer having the formula

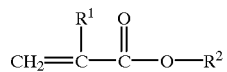

wherein $R^1$ is hydrogen or methyl and $R^2$ is a hydroxy alkyl group having from 2 to 6 carbon atoms, and the weight percents of monomers used to prepare the copolymer are based on the weight of (a)+(b)+(c); and b) from about 1.5 to about 7 weight percent, based on the weight of the copolymer, of a crosslinking agent selected from the group consisting of multifunctional aziridine, multifunctional isocyanate, and multifunctional epoxide, wherein the crosslinking reaction does not generate volatile organic compounds as by-products.

3. The composition according to claim 2 wherein the ethylenically unsaturated hydroxy-functional monomer is selected from the group consisting of hydroxyethyl acrylate, hydroxypropyl acrylate, hydroxybutyl acrylate and combinations thereof.

4. The composition according to claim 3 wherein the ethylenically unsaturated hydroxy-functional monomer is hydroxyethyl acrylate.

5. The composition according to claim 1 further comprising an additive selected from the group consisting of fillers, dispersants, flame retardants, antimicrobials, foaming agents, thickeners, colorants, and catalysts.

6. The composition according to claim 5 wherein the filler is selected from the group consisting of calcium carbonate, aluminum hydroxide, clay, talc, and combinations thereof.

7. The composition according to claim 5 wherein the catalyst is a Lewis acid.

* * * * *